US010962446B2

(12) United States Patent
Scheer et al.

(10) Patent No.: US 10,962,446 B2
(45) Date of Patent: Mar. 30, 2021

(54) HOUSING CONNECTION ELEMENT

(71) Applicant: Eberspächer Exhaust Technology GmbH & Co. KG, Neunkirchen (DE)

(72) Inventors: Matthias Scheer, Oberthal (DE); Christoph Buckermann, Kirchheim unter Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 222 days.

(21) Appl. No.: 16/205,853

(22) Filed: Nov. 30, 2018

(65) Prior Publication Data

US 2019/0170611 A1 Jun. 6, 2019

(30) Foreign Application Priority Data

Dec. 1, 2017 (DE) ...................... 10 2017 128 607.1

(51) Int. Cl.
*F01N 13/00* (2010.01)
*F01N 13/08* (2010.01)
(Continued)

(52) U.S. Cl.
CPC ........... *G01M 15/02* (2013.01); *F01N 13/008* (2013.01); *F01N 13/16* (2013.01); *F01N 13/18* (2013.01);
(Continued)

(58) Field of Classification Search
CPC .. F01N 13/00; F01N 13/008; F01N 13/08–10; F01N 13/16; F01N 13/18; F01N 13/185; F01N 13/1805; F01N 13/1861; F01N 13/1872; F01N 13/1894; F01N 2530/02; F01N 2450/22; G01M 15/02; G01M 15/10; G01M 15/102
See application file for complete search history.

(56) References Cited

U.S. PATENT DOCUMENTS 5,615,551 A * 4/1997 Matsushima ....... F01N 13/1888
60/276
8,935,914 B2 * 1/2015 Okami ...................... F01N 3/28
60/276
(Continued)

FOREIGN PATENT DOCUMENTS

CN 1392920 A 1/2003
CN 101063419 A 10/2007
(Continued)

*Primary Examiner* — Nguyen Q. Ha
(74) *Attorney, Agent, or Firm* — McGlew and Tuttle, P.C.

(57) ABSTRACT

A housing connection element (10) for a housing of an exhaust gas treatment assembly unit of an exhaust system, especially for an internal combustion engine, includes a first housing part (16) with an essentially cylindrical first connection area (18) for connection to a circumferential wall (14) of a housing (12) of an exhaust gas treatment assembly unit. A tapered area (20) is adjacent to the first connection area (18). An annular, second housing part (40) is connected to the tapered area (20). A second connection area (46) is provided for connection to an exhaust gas-carrying component of an exhaust system. At least one sensor sleeve (48, 50) is in a sleeve receiving area (24) of the first housing part (16). The sleeve receiving area (24) is formed in the tapered area (20).

16 Claims, 2 Drawing Sheets

(51) Int. Cl.
*F01N 13/18* (2010.01)
*G01M 15/02* (2006.01)
*F01N 13/16* (2010.01)
*G01M 15/10* (2006.01)

(52) U.S. Cl.
CPC ....... *F01N 13/185* (2013.01); *F01N 13/1805* (2013.01); *F01N 13/1861* (2013.01); *F01N 13/1872* (2013.01); *F01N 13/1894* (2013.01); *G01M 15/102* (2013.01); *F01N 2450/22* (2013.01); *F01N 2530/02* (2013.01)

(56) References Cited

U.S. PATENT DOCUMENTS

| | | | |
|---|---|---|---|
| 10,557,396 B2* | 2/2020 | Kimura | F02D 41/0255 |
| 2005/0142043 A1* | 6/2005 | Pekrul | F01N 13/14 422/179 |
| 2007/0160510 A1* | 7/2007 | Schultz | B21J 5/066 422/177 |
| 2010/0307001 A1 | 12/2010 | Hill, Jr. et al. | |
| 2012/0312011 A1* | 12/2012 | Romblom | F02M 26/06 60/605.1 |
| 2013/0133311 A1* | 5/2013 | Shimizu | F01N 13/008 60/276 |
| 2015/0047323 A1* | 2/2015 | Beaver | F01N 3/2803 60/274 |
| 2017/0159539 A1 | 6/2017 | Jang et al. | |
| 2017/0204766 A1* | 7/2017 | Matsui | A01D 41/12 |

FOREIGN PATENT DOCUMENTS

| | | |
|---|---|---|
| DE | 10 2007 020040 A1 | 11/2007 |
| DE | 10 2015 121 110 A1 | 6/2017 |
| JP | 2000 073755 A | 3/2000 |
| WO | 2016/152541 A1 | 9/2016 |
| WO | WO-2019192123 A1 * | 10/2019 ............ F01N 13/00 |

* cited by examiner

HOUSING CONNECTION ELEMENT

CROSS REFERENCE TO RELATED APPLICATIONS

This application claims the benefit of priority under 35 U.S.C. § 119 of German Application 10,2017/128607.1, filed Dec. 1, 2017, the entire contents of which are incorporated herein by reference.

TECHNICAL FIELD

The invention pertains to a housing connection element for a housing of an exhaust gas treatment assembly unit of an exhaust system, especially for an internal combustion engine.

BACKGROUND

Exhaust gas treatment assembly units, for example, catalytic converter devices, used in exhaust systems for internal combustion engines, for example, for vehicles, generally comprise a housing with a tubular, essentially cylindrical circumferential wall, in which an exhaust gas treatment element, for example, a catalytic converter block, is received. Connection elements, with which a respective exhaust gas treatment assembly unit can be connected to other, generally tubular, exhaust gas-carrying components are provided at the two axial end areas of such a circumferential wall.

SUMMARY OF THE INVENTION

An object of the present invention is to provide a housing connection element for a housing of an exhaust gas treatment assembly unit of an exhaust system, especially for an internal combustion engine, which can be manufactured in a simple manner even in case of a comparatively complex geometry, as well as a process for the manufacture thereof.

According to a first aspect, the object is accomplished by a housing connection element for a housing of an exhaust gas treatment assembly unit of an exhaust system, especially for an internal combustion engine, comprising:
- a first housing part with an essentially cylindrical first connection area for connection to a circumferential wall of a housing of an exhaust gas treatment assembly unit and with a tapered area adjacent to the first connection area,
- an annular, second housing part, which is connected to the tapered area, with a second connection area for connection to an exhaust gas-carrying component of an exhaust system, and at least one sensor sleeve in a sleeve receiving area of the first housing part, which sleeve receiving area is formed in the tapered area.

In case of the housing connection element configured in this manner, various structural elements, which are used, on the one hand, for the receipt of one or more sensors, and which guarantee a stable connection both to the housing of an exhaust gas treatment assembly unit and to other exhaust gas-carrying components, on the other hand, can be provided in a simple manner.

An embodiment, in which the first housing part is configured as a shaped sheet metal part, or/and the second housing part is configured as a precision casting, is especially advantageous here. Thus, on the one hand, the first housing part can be provided in a simple manner with a comparatively complex geometry, while, on the other hand, the second housing part guarantees a precise and very permanent connection to other exhaust gas-carrying components. In the configuration of the second housing part, this part may also be machined by removing material. Configuration of the second housing part by machining by removing material, for example, machining by removal of metal by cutting of a ring separated from a thick-walled pipe or from a blank, is possible.

For example, provisions may be made for the sleeve receiving area to comprise a sleeve receiving surface area in a recessed area that is deformed inwardly with at least one sleeve receiving opening, preferably two sleeve receiving openings following one another in the circumferential direction in relation to a longitudinal central axis, wherein a sensor sleeve is arranged in the at least one sleeve receiving opening. In this case, the recessed area with its sleeve receiving surface area can be shaped such that a desired position in space can be guaranteed for one or more sensors to be provided on it.

A sufficiently acute angle of incidence of one or more sensors in relation to the exhaust gas stream can be achieved by an angle formed between the sleeve receiving surface area and the longitudinal central axis being smaller than an angle between an area of the tapered area, which area is adjacent to the sleeve receiving area in the circumferential direction, and the longitudinal central axis. It should be pointed out that the smaller of the two angles formed between the respective surface taken into consideration and the longitudinal central axis are each compared with one another.

For a connection of the second housing part to the first housing part which is stable and simple to establish, it is proposed that a connection flange area that is directed inwardly in relation to an exhaust gas passage opening formed in the end area be provided in an end area of the tapered area, and that the second housing part be connected to the connection flange area in an annular body area.

A stable connection between the second housing part and an additional, exhaust gas-carrying component adjacent to it can be obtained by the second connection area comprising a connection flange protruding in the outward direction from an annular body area of the second housing part.

While considering a comparatively complex geometry that can be achieved with the configuration according to the present invention, a stable and especially exhaust gas-tight connection of the first housing part to the components to be connected to it can also advantageously be achieved by the second housing part being connected to the first housing part by laser welding, or/and by the at least one sensor sleeve being connected to the first housing part by laser welding.

The present invention further pertains to an exhaust gas treatment assembly unit, especially catalytic converter device, comprising a tubular circumferential wall and a housing connection element with the configuration described above at an end area of the circumferential wall.

According to another aspect, the object mentioned in the introduction is accomplished by a process for the manufacture of a housing connection element configured according to the present invention, which comprises the following steps:
- a) provision of the first housing part as a shaped sheet metal part with an exhaust gas passage opening in an end area of the tapered area and with at least one sleeve receiving opening in the sleeve receiving area, b) provision of the second housing part, c) connection of the second housing part to the first housing part in the area of the exhaust gas passage opening formed therein by laser welding, and d) insertion of a sensor sleeve into the at least one sleeve receiving opening and connection of the sensor sleeve to the first housing part by laser welding.

The second housing part is provided as a precision casting in step b) here.

A procedure for providing the first housing part even with a comparatively complex geometry that is simple to implement can foresee that the first housing part is provided in a deep-drawing/laser-cutting operation in step a), wherein a housing blank is provided in a deep-drawing operation from a plate-like sheet metal blank with the essentially cylindrical first connection area and with the tapered area with a recessed area for the sleeve receiving area and the at least one sleeve receiving opening is formed in the recessed area in a subsequent laser-cutting operation.

For a production process that is simple to carry out, it is further proposed that the exhaust gas passage opening be formed in the deep-drawing operation. A correspondingly shaped deep-drawing die is used for this, which not only ensures a corresponding deformation, but at the same time also performs a separation of a material area to be removed for the formation of the exhaust gas passage opening. As an alternative, the exhaust gas passage opening may be formed during the laser-cutting operation.

Here, a connection flange area surrounding the exhaust gas passage opening and directed inwards is preferably formed during the formation of the exhaust gas passage opening, and an annular body area of the second housing part may be connected to the connection flange area in step c).

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
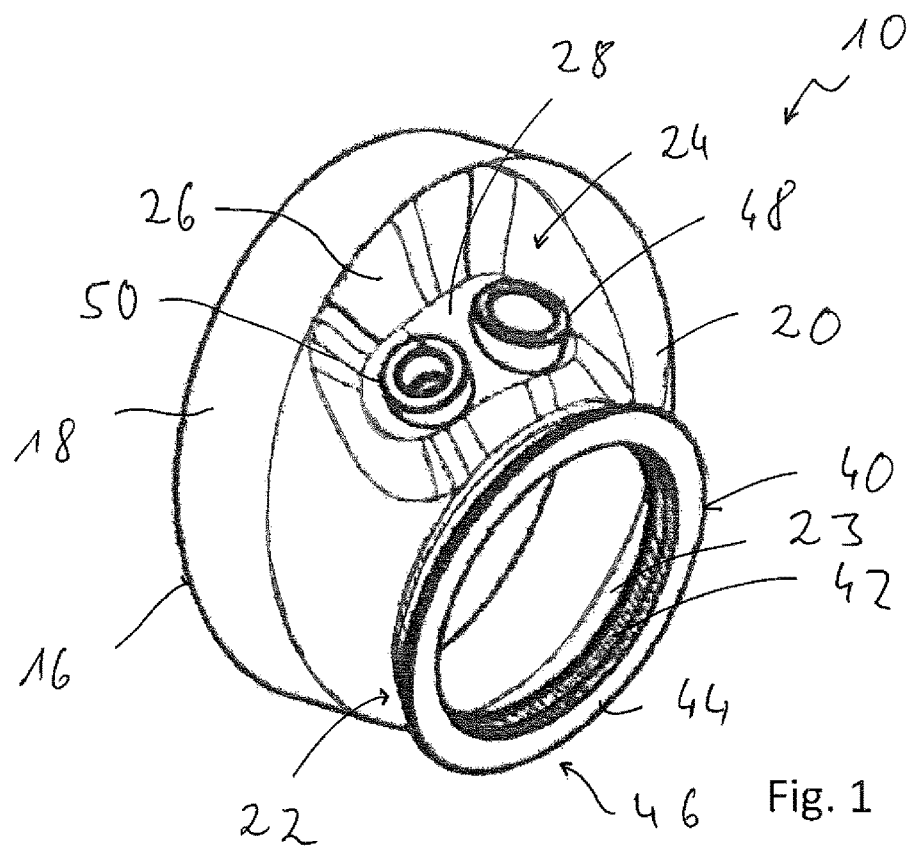
FIG. 1 is a perspective view of a housing connection element for an exhaust gas treatment assembly unit.
Figure 2:
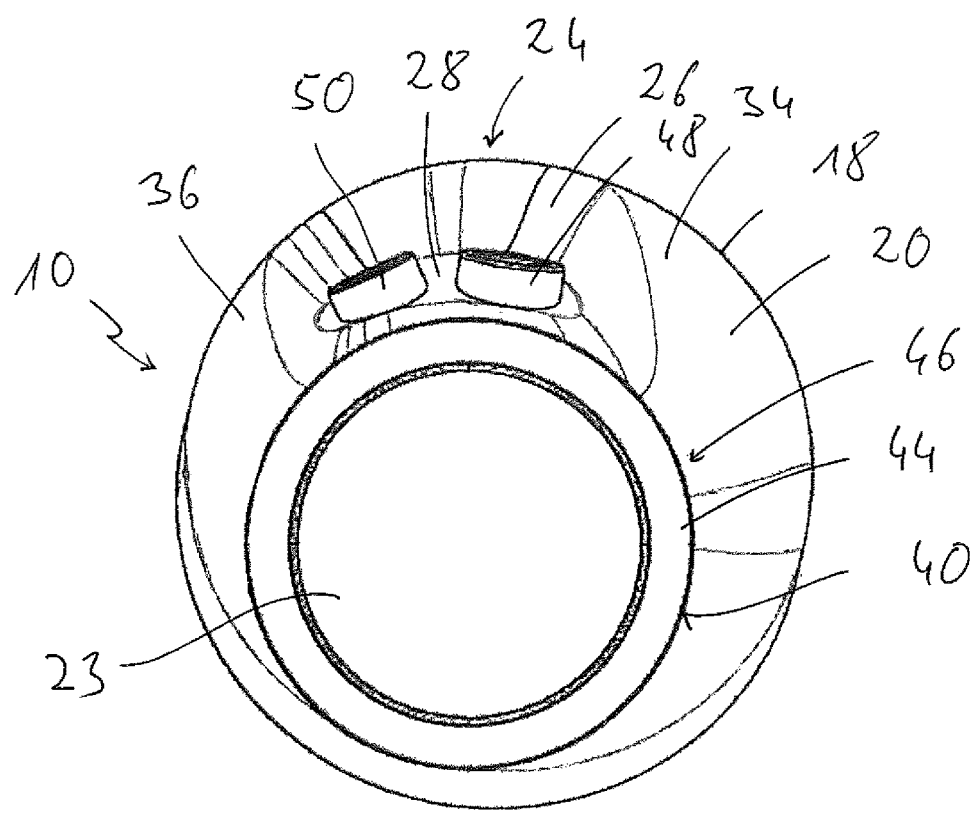
FIG. 2 is an end perspective view of the housing connection element from FIG. 1.
Figure 3:
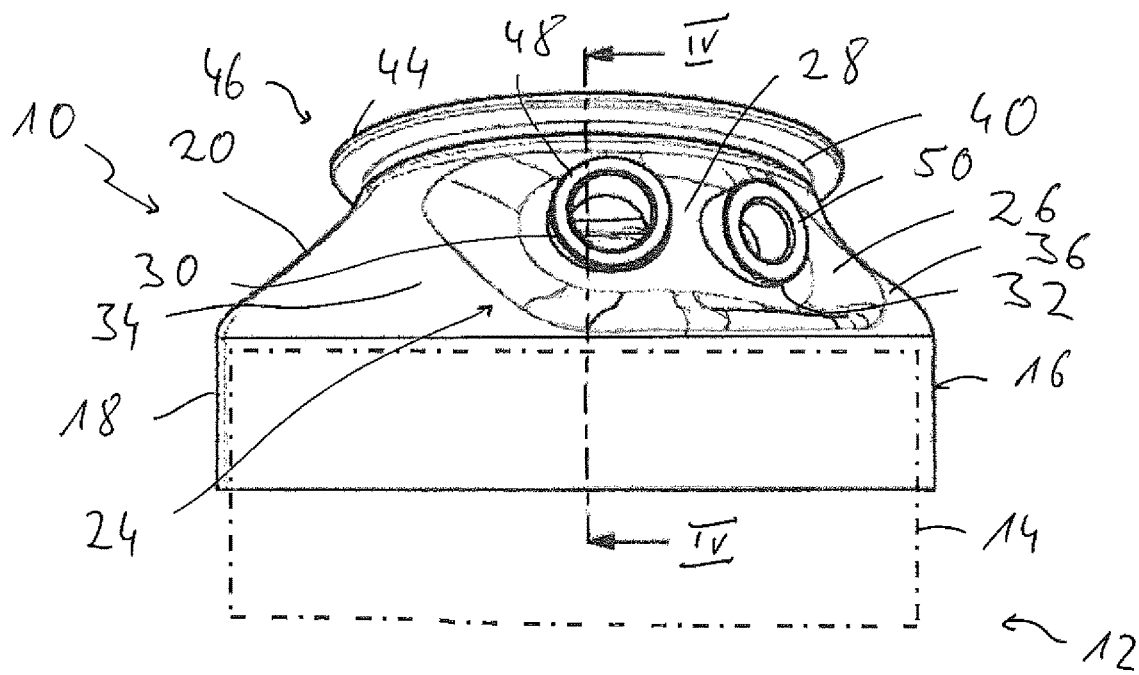
FIG. 3 is a lateral view of the housing connection element.

Referring to the drawings, the figures show in various perspective views and in a sectional view a housing connection element, which is generally designated by 10, for a housing of an exhaust gas treatment assembly unit, e.g., a catalytic converter device, which is generally designated by 12 in FIG. 3. Such a housing generally comprises a tubular or essentially cylindrical circumferential wall 14, in which, for example, a catalytic converter block can be received with intercalation of a fiber mat or the like. The housing connection element 10 configured or manufactured according to the present invention is, for example, pushed onto the end area of this circumferential wall 14 shown in FIG. 3 and permanently connected to it by welding or soldering.

The housing connection element 10 comprises a first housing part 16, which is provided as a shaped sheet metal part. The first housing part 16 is in turn configured with an essentially cylindrical first connection area 18, in which the housing connection element 10 can be positioned adjacent to the circumferential wall 14 of the housing 12. The first connection area 18 is provided with a circumferential geometry, which essentially corresponds to the circumferential geometry of the circumferential wall 14, i.e., for example, with a circular circumferential geometry.

The first housing part 16 has a tapered area 20 adjacent to the essentially cylindrical first connection area 18. The cross-sectional dimension of the first housing part 16 decreases in this tapered area 20, which has, for example, a frustoconical configuration, but is not necessarily symmetrical to a longitudinal central axis L of the first connection area 18. An exhaust gas passage opening 23 is formed in the first housing part 16 or in the tapered area 20 in an end area 22 of the tapered area 20, which is positioned facing away from the first connection area 18. In the embodiment shown in the figures, this exhaust gas passage opening is positioned such that an opening plane and also a longitudinal central axis of the opening have an angle of incidence to the longitudinal central axis L of the first connection area 18.

Figure 4:
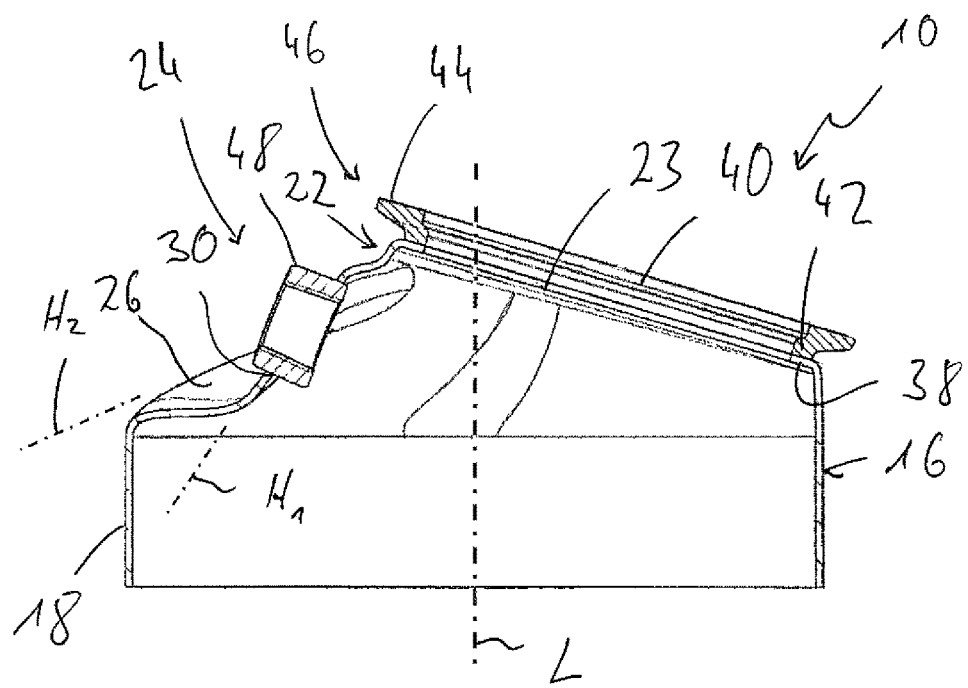
FIG. 4 is a longitudinal sectional view of the housing connection element, cut along a line IV-IV in FIG. 3.

A sleeve receiving area, which is generally designated by 24, is formed in the tapered area 20 of the first housing part 16. The sleeve receiving area 24 is essentially provided by a recess 26 directed towards the interior of the first housing part 16, which recess has a sleeve receiving surface area 28, which is curved about the longitudinal central axis L, with two sleeve receiving openings 30, 32 following one another in the circumferential direction about the longitudinal central axis L. By providing the sleeve receiving surface area 28 in the recessed area 26, it is achieved that the sleeve receiving surface area 28 has a smaller angle in relation to the longitudinal central axis L than an area 34 or 36 of the tapered area 20, each area 34 or 36 following the recessed area 26 in the circumferential direction. This is shown in FIG. 4 by the auxiliary line H1 associated with the sleeve receiving surface area 28 as well as the auxiliary line H2 associated with the areas 34 and 36.

The first housing part 16 described above is manufactured by shaping, especially deep-drawing, of a plate-like sheet metal blank. The exhaust gas passage opening 23 can be formed in the end area 22 of the tapered area 20 during the shaping operation carried out using corresponding shapes such that a connection flange area 38 protruding inwards, i.e., towards the exhaust gas passage opening 23, is formed in the end area 22. In this case, the material area to be removed for the provision of the exhaust gas passage opening 23 is separated due to the shapes used in the deep-drawing operation. Further, the two sleeve receiving openings 30, 32 are formed in the sleeve receiving surface area 28 in a laser-cutting operation by separation of the corresponding material areas from the blank for the first housing part 16 formed due to shaping of a plate-like sheet metal blank. It should be pointed out that, as an alternative, the exhaust gas passage opening 23 may also be formed in such a laser-cutting operation by cutting out of the corresponding material area from the blank for the first housing part 16.

After the first housing part 16 has been provided in the manner described above in a deep-drawing/laser-cutting operation, a second housing part, which is generally designated by 40, is fixed to the first housing part 16 in the end area 22. The second housing part 40 is configured with an annular body area 42, which is positioned obtusely at the connection flange area 38 and is connected to this connection flange area by laser welding. The same laser may advantageously be used in this laser welding operation that was also used in the laser-cutting operation described above for the formation of the sleeve receiving openings 30, 32, possibly also for the formation of the exhaust gas passage opening 23. A connection flange 44 surrounding the annular body area in an annular manner protrudes from this body area radially in the outward direction in relation to the exhaust gas passage opening 23, wherein a second connection area 46 of the housing connection element 10 is provided in this way.

The second housing part 40 is provided as a precision casting with high shape accuracy and makes possible the connection of the housing connection element to other, for example, tubular, exhaust gas-carrying components at an exhaust system, for example, at the exhaust manifold of an internal combustion engine or an exhaust gas turbocharger. A pipe clamp or the like, which surrounds the connection flange 44 and a corresponding flange of an exhaust gas-carrying component to be connected to it, may be used for this.

Sensor sleeves 48, 50 are inserted into the sleeve receiving openings 30, 32 formed in the sleeve receiving area 24. In this case, longitudinal central axes of these sensor sleeves 48, 50 are positioned to achieve a desired position in space of the sensors to be inserted into these sensor sleeves 48, 50, for example, by screw connection, such that they occupy an angular position deviating from 90° in relation to the sleeve receiving surface area 28. Due to the angle of incidence of the sleeve receiving surface area 28 in relation to the longitudinal central axis L, which angle of incidence can be seen in FIG. 4, and due to the angle of incidence of the sensor receiving sleeves 48, 50 in relation to the sleeve receiving flange area, which angle of incidence can be seen in FIG. 4, even though sensors arranged in these sensor receiving sleeves 48, 50 are, in principle, positioned in the tapered area 20, such an alignment of the sensors to be meshed with the interior of the housing connection element 10 can be achieved by these having approximately an angle of 90° in relation to the exhaust gas stream passing through the exhaust gas passage opening 23 and a main flow direction of same.

The sensor receiving sleeves 48, 50 are also connected to the first housing part 16 by laser welding. Just as in the connection of the second housing part 40 to the first housing part 16, an interruption-free, continuous weld seam is also formed here, so that gas-tight connection of the sensor receiving sleeves 48, 50 and of the second housing part 40 to the first housing part 16 is achieved.

With the configuration according to the present invention, in which the first housing part 16 with its components, the first connection area 18, tapered area 20 and sleeve receiving area 24, is obtained as an integral, i.e., one-piece component by shaping of a sheet metal blank, it is possible to provide this first housing part 16 with a comparatively complex geometry in a simple manner. All those components of the housing connection element 10 that require an even higher production precision or/and tightness, i.e., especially the second housing part 40 and the sensor sleeves 48, 50, are connected as separate components to the first housing part 16 by laser welding and provided by production processes suitable for each of these components. In this case, the high dimensional accuracy achieved in case of the housing connection element 10 is also supported by the laser welding process used for the connection of various components.

Finally, it should be pointed out that, while retaining the principles of the present invention, the housing connection element shown in the figures may, of course, be varied in many different ways. Thus, of course, the essentially cylindrical first connection area could be configured with a shorter axial dimension or even have a stepped or conically expanding or diameter-decreasing configuration. A cylindrical section essentially providing the exhaust gas passage opening 23 could be adjacent to the tapered area in the end area 22, to which section the second housing part 40 is then to be connected and which can be considered as essentially providing the end area 22 of the tapered area 20 in the sense of the present invention. Instead of the two sensor receiving sleeves shown, which may receive, for example, a temperature sensor and an oxygen sensor, more or fewer sensor receiving sleeves may also be provided in the receiving surface area 28 in a correspondingly adapted number of sleeve receiving openings. Of course, a plurality of recessed areas distributed over the circumference could be provided for the provision of a sleeve receiving area, so that the sensor sleeves and thus the sensors received therein can be positioned in different circumferential areas. The tapered area could, in principle, also have a symmetrical shape, so that, for example, the exhaust gas passage opening 23 formed in the end area 22 of same can be arranged centrally to the longitudinal central axis L and with an opening plane at right angles to same.

While specific embodiments of the invention have been shown and described in detail to illustrate the application of the principles of the invention, it will be understood that the invention may be embodied otherwise without departing from such principles.

What is claimed is:

1. A housing connection element for a housing of an exhaust gas treatment assembly unit of an exhaust system for an internal combustion engine, the housing connection element comprising:
   a first housing part comprising an essentially cylindrical first connection area for connection to a circumferential wall of a housing of an exhaust gas treatment assembly unit and a tapered area adjacent to the first connection area;
   an annular, second housing part, the second housing part being connected to the tapered area, the second housing part comprising a second connection area for connection to an exhaust gas-carrying component of an exhaust system; and
   at least one sensor sleeve in a sleeve receiving area of the first housing part, the sleeve receiving area being formed in the tapered area, the sleeve receiving area comprising a sleeve receiving surface area in a recessed area that is deformed inwardly with at least one sleeve receiving opening, the at least one sensor sleeve being received in the at least one sleeve receiving opening, wherein an angle formed between the sleeve receiving surface area and a longitudinal central axis is smaller than an angle between an area of the tapered area, which said area is adjacent to the sleeve receiving area in the circumferential direction, and the longitudinal central axis.

2. A housing connection element in accordance with claim 1, wherein:
the first housing part is configured as a shaped sheet metal part; or
the second housing part is configured as a precision casting; or
the second housing part is configured as a part that is machined by removing metal material by cutting; or
the second housing part is configured as a precision casting and is machined by removing metal material by cutting; or
any combination of the first housing part is configured as a shaped sheet metal part, the second housing part is configured as a precision casting, the second housing part is configured as a part that is machined by removing metal material by cutting, and the second housing part is configured as a precision casting and is machined by removing metal material by cutting.

3. A housing connection element in accordance with claim 1, wherein:
two sleeve receiving openings are provided in the recessed area following one another in a circumferential direction in relation to the longitudinal central axis; and
a sensor sleeve of the at least one sensor sleeve is received in each one of the sleeve receiving openings.

4. A housing connection element in accordance with claim 1, wherein:
the tapered area has an end area;
a connection flange area, which is directed inwardly in relation to an exhaust gas passage opening formed in the end area of the tapered area, is provided in the end area of the tapered area;
the second housing part has an annular body area; and
the second housing part is connected to the connection flange area in the annular body area.

5. A housing connection element in accordance with claim 4, wherein the second connection area comprises a connection flange protruding in an outward direction from the annular body area of the second housing part.

6. A housing connection element in accordance with claim 1, wherein:
the second housing part is connected to the first housing part by laser welding; or
the at least one sensor sleeve is connected to the first housing part by laser welding; or
the second housing part is connected to the first housing part by laser welding and the at least one sensor sleeve is connected to the first housing part by laser welding.

7. An exhaust gas treatment assembly unit comprising:
a tubular circumferential wall; and
a housing connection element at an end area of the circumferential wall, the housing connection element comprising:
a first housing part comprising an essentially cylindrical first connection area for connection to a circumferential wall of a housing of an exhaust gas treatment assembly unit and a tapered area adjacent to the first connection area;
an annular, second housing part, the second housing part being connected to the tapered area, the second housing part comprising a second connection area for connection to an exhaust gas-carrying component of an exhaust system; and
at least one sensor sleeve in a sleeve receiving area of the first housing part, the sleeve receiving area being formed in the tapered area, the sleeve receiving area comprising a sleeve receiving surface area in a recessed area that is deformed inwardly with at least one sleeve receiving opening, the at least one sensor sleeve being received in the at least one sleeve receiving opening, wherein an angle formed between the sleeve receiving surface area and a longitudinal central axis is smaller than an angle between an area of the tapered area, which said area is adjacent to the sleeve receiving area in the circumferential direction, and the longitudinal central axis.

8. An exhaust gas treatment assembly unit in accordance with claim 7, wherein:
the first housing part is configured as a shaped sheet metal part; or
the second housing part is configured as a precision casting; or
the second housing part is configured as a part that is machined by removing metal material by cutting; or
the second housing part is configured as a precision casting and is machined by removing metal material by cutting; or
any combination of the first housing part is configured as a shaped sheet metal part, the second housing part is configured as a precision casting, the second housing part is configured as a part that is machined by removing metal material by cutting, and the second housing part is configured as a precision casting and is machined by removing metal material by cutting.

9. An exhaust gas treatment assembly unit in accordance with claim 7, wherein:
the tapered area has an end area;
a connection flange area, which is directed inwardly in relation to an exhaust gas passage opening formed in the end area of the tapered area, is provided in the end area of the tapered area;
the second housing part has an annular body area; and
the second housing part is connected to the connection flange area in the annular body area.

10. An exhaust gas treatment assembly unit in accordance with claim 9, wherein the second connection area comprises a connection flange protruding in an outward direction from the annular body area of the second housing part.

11. An exhaust gas treatment assembly unit in accordance with claim 7, wherein:
the second housing part is connected to the first housing part by laser welding; or
the at least one sensor sleeve is connected to the first housing part by laser welding; or
the second housing part is connected to the first housing part by laser welding and the at least one sensor sleeve is connected to the first housing part by laser welding.

12. A process for the manufacture of a housing connection element comprising a first housing part comprising an essentially cylindrical first connection area for connection to a circumferential wall of a housing of an exhaust gas treatment assembly unit and a tapered area adjacent to the first connection area, an annular, second housing part, the second housing part being connected to the tapered area, the second housing part comprising a second connection area for connection to an exhaust gas-carrying component of an exhaust system, and at least one sensor sleeve in a sleeve receiving area of the first housing part, the sleeve receiving area being formed in the tapered area, the process comprising the steps of:
providing the first housing part as a shaped sheet metal part with an exhaust gas passage opening in an end area of the tapered area and with at least one sleeve receiving opening in the sleeve receiving area;

providing the second housing part;

connecting the second housing part to the first housing part, in the area of the exhaust gas passage opening formed therein, by laser welding; and inserting a sensor sleeve into the at least one sleeve receiving opening and connection of the sensor sleeve to the first housing part by laser welding, wherein the first housing part is provided in a deep-drawing/laser-cutting operation, a housing blank being formed in a deep-drawing operation from a plate-shaped sheet metal blank with the essentially cylindrical first connection area and with the tapered area with a recessed area for the sleeve receiving area, and the at least one sleeve receiving opening being formed in the recessed area in a subsequent laser-cutting operation.

13. A process in accordance with claim 12, wherein the second housing part is provided as a precision casting.

14. A process in accordance with claim 12, wherein the exhaust gas passage opening is formed in the deep-drawing operation or in the laser-cutting operation.

15. A process in accordance with claim 14, wherein:
a connection flange area surrounding the exhaust gas passage opening and directed inwards is formed during the formation of the exhaust gas passage opening; and
an annular body area of the second housing part is connected to the connection flange area in the step of connecting the second housing part to the first housing part.

16. A housing connection element for a housing of an exhaust gas treatment assembly unit of an exhaust system for an internal combustion engine, the housing connection element comprising:
a first housing part comprising an essentially cylindrical first connection area for connection to a circumferential wall of a housing of an exhaust gas treatment assembly unit and a tapered area adjacent to the first connection area;
an annular, second housing part, the second housing part being connected to the tapered area, the second housing part comprising a second connection area for connection to an exhaust gas-carrying component of an exhaust system;
a sleeve receiving area of the first housing part, the sleeve receiving area being formed in the tapered area and comprising a sleeve receiving surface area in a recessed area that is deformed inwardly with two sleeve receiving openings following one another in a circumferential direction in relation to a longitudinal central axis; and
a sensor sleeve being received in each one of the sleeve receiving openings.

* * * * *